United States Patent
Trombley et al.

(10) Patent No.: US 7,152,900 B2
(45) Date of Patent: Dec. 26, 2006

(54) SEAT ASSEMBLY WITH AUTOMATIC STOW FEATURE

(75) Inventors: Matthew T. Trombley, Allen Park, MI (US); Eric A. Woods, Allen Park, MI (US); David K. Williams, South Lyon, MI (US); Mark A. Folkert, Farmington Hills, MI (US); John Malcolm, Windsor (CA); Michael R. Ferrari, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 92 days.

(21) Appl. No.: 10/907,039

(22) Filed: Mar. 17, 2005

(65) Prior Publication Data

US 2006/0208520 A1    Sep. 21, 2006

(51) Int. Cl.
B60N 2/02    (2006.01)

(52) U.S. Cl. ............................................. 296/65.09

(58) Field of Classification Search ............. 296/65.09, 296/65.05, 65.08; 297/326, 330, 331, 335
See application file for complete search history.

(56) References Cited

U.S. PATENT DOCUMENTS

| | | | |
|---|---|---|---|
| 5,269,581 A * | 12/1993 | Odagaki et al. | 296/65.09 |
| 6,345,867 B1 | 2/2002 | Hellrung et al. | |
| 6,416,107 B1 * | 7/2002 | Kanaguchi et al. | 296/65.09 |
| 6,435,589 B1 * | 8/2002 | Shimizu et al. | 296/65.09 |
| 6,626,481 B1 * | 9/2003 | Kawasaki | 296/65.09 |
| 6,644,730 B1 * | 11/2003 | Sugiura et al. | 296/65.09 |
| 6,682,120 B1 * | 1/2004 | Kamida et al. | 296/65.09 |
| 6,705,657 B1 * | 3/2004 | Kutomi et al. | 296/65.09 |
| 6,705,658 B1 * | 3/2004 | Jach et al. | 296/65.09 |
| 6,709,040 B1 * | 3/2004 | Drew et al. | 296/65.09 |
| 6,749,247 B1 | 6/2004 | Mack et al. | |
| 6,793,265 B1 * | 9/2004 | Kamida et al. | 296/65.09 |
| 6,820,911 B1 * | 11/2004 | Furui | 296/65.09 |
| 6,837,530 B1 * | 1/2005 | Rudberg et al. | 296/65.09 |
| 6,860,562 B1 | 3/2005 | Bonk | |
| 6,869,138 B1 * | 3/2005 | Rhodes et al. | 296/65.09 |
| 6,932,424 B1 * | 8/2005 | Rhodes et al. | 296/65.09 |
| 6,988,768 B1 * | 1/2006 | Kutomi et al. | 296/65.09 |
| 7,014,260 B1 * | 3/2006 | Moriyama et al. | 296/65.09 |
| 7,040,685 B1 * | 5/2006 | Sumida et al. | 296/65.09 |
| 7,063,368 B1 * | 6/2006 | Kayumi | 296/65.05 |
| 2001/0002759 A1 * | 6/2001 | Nishide | 296/65.09 |
| 2005/0046261 A1 | 3/2005 | Grable et al. | |
| 2005/0236881 A1 * | 10/2005 | Suda et al. | 297/378.1 |

FOREIGN PATENT DOCUMENTS

EP    1 452 388 A8    9/2004

(Continued)

Primary Examiner—Kiran B. Patel
(74) Attorney, Agent, or Firm—Brooks Kushman P.C.

(57) ABSTRACT

A seat assembly for use with a vehicle having a vehicle body includes a seat bottom that is configured to be pivotably mounted to the vehicle body, a seat back pivotally connected to the seat bottom, a seat back latch associated with the seat back for inhibiting movement of the seat back with respect to the seat bottom, and an automatic stow arrangement for moving the seat bottom and seat back from a use position to a stowed position. The stow arrangement is associated with the seat back latch and is configured to release the seat back latch to allow the seat back to pivot in a first direction toward the seat bottom. The stow arrangement is further configured to pivot the seat bottom and seat back in a second direction opposite the first direction to the stowed position.

11 Claims, 4 Drawing Sheets

FOREIGN PATENT DOCUMENTS

| | | |
|---|---|---|
| EP | 1 493 611 A1 | 1/2005 |
| JP | 2005-14843 | 1/2005 |

\* cited by examiner

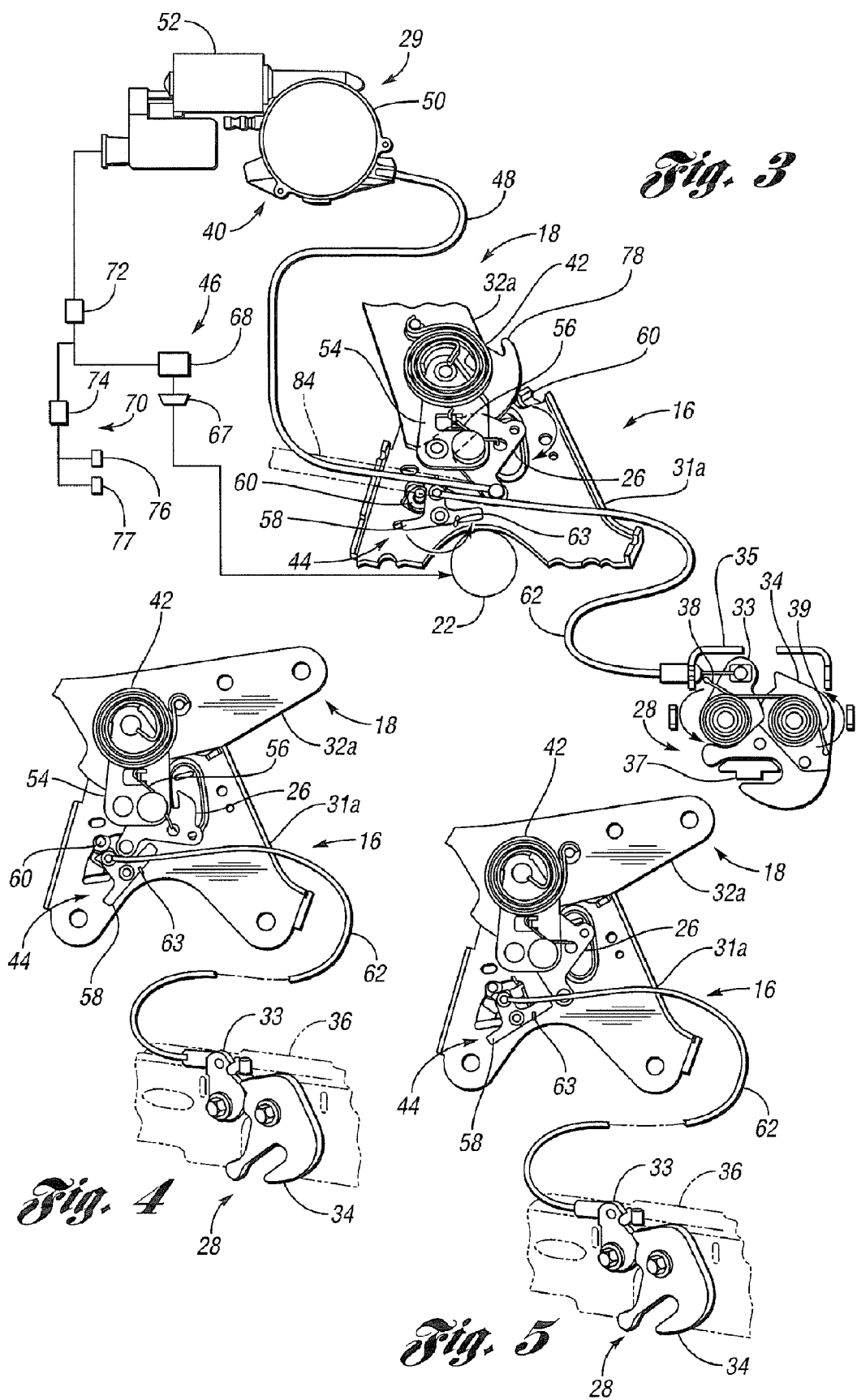

SEAT ASSEMBLY WITH AUTOMATIC STOW FEATURE

BACKGROUND OF THE INVENTION

1. Field of the Invention

The invention relates to a vehicle seat assembly that is moveable from a use position to a stowed position.

2. Background Art

Vehicle seat assemblies may be configured to move between use positions and collapsed or stowed positions. Examples of such seat assemblies are disclosed in U.S. Pat. Nos. 6,705,658 and 6,749,247.

SUMMARY OF THE INVENTION

Under the invention, a seat assembly for use with a vehicle having a vehicle body is provided. In one embodiment, the assembly includes a seat bottom that is configured to be pivotably mounted to the vehicle body, a seat back pivotally connected to the seat bottom, a seat back latch associated with the seat back for inhibiting movement of the seat back with respect to the seat bottom, and an automatic stow arrangement for moving the seat bottom and seat back from a use position to a stowed position. The stow arrangement is associated with the seat back latch and is configured to release the seat back latch to allow the seat back to pivot in a first direction toward the seat bottom. The stow arrangement is further configured to pivot the seat bottom and seat back in a second direction opposite the first direction to the stowed position.

In another embodiment, the assembly includes a seat bottom that is configured to be pivotably mounted to the vehicle body such that the seat bottom is moveable between a use position and a stowed position, a latch associated with the seat bottom and being configured to engage the vehicle body to inhibit movement of the seat bottom with respect to the vehicle body, and a motorized stow arrangement for moving the seat bottom from the use position to the stowed position. The stow arrangement is associated with the latch and is configured to automatically release the latch to allow the seat bottom to pivot to the stowed position.

In yet another embodiment, the assembly includes a seat bottom and a mounting arrangement associated with the seat bottom for mounting the seat bottom to the vehicle body, wherein the mounting arrangement includes a pivot member about which the seat bottom may pivot. The assembly further includes a first latch associated with the seat bottom and being engageable with the vehicle body for inhibiting movement of the seat bottom with respect to the vehicle body, a seat back pivotally connected to the seat bottom, a second latch associated with the seat back for inhibiting movement of the seat back with respect to the seat bottom, and an automatic stow arrangement for moving the seat bottom and seat back from a use position to a stowed position. The stow arrangement is associated with the first and second latches and is configured to release the latches to allow the seat back to pivot in a first direction toward the seat bottom, and to allow the seat bottom and seat back to pivot together in a second direction opposite the first direction to the stowed position. The stow arrangement includes a biasing member associated with the seat back for urging the seat back to pivot in the first direction toward the seat bottom, a locking mechanism that is configured to inhibit movement of the seat back away from the seat bottom after the first latch has been released, and a drive mechanism connected to the seat bottom and being engageable with the pivot member to automatically pivot the seat bottom and seat back to the stowed position.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3 is a schematic view of the seat assembly of FIG. 2 showing the seat bottom and seat back in the use position;

FIG. 4 is a schematic view of the seat assembly of FIG. 2, wherein a seat back frame member of the seat back is shown pivoted toward a seat bottom frame member of the seat bottom;

FIG. 5 is a schematic view of the seat assembly of FIG. 2 showing a locking mechanism of the stow arrangement in a locking position for inhibiting movement of the seat back away from the seat bottom;

DETAILED DESCRIPTION OF THE PREFERRED EMBODIMENT(S)

Figure 1:
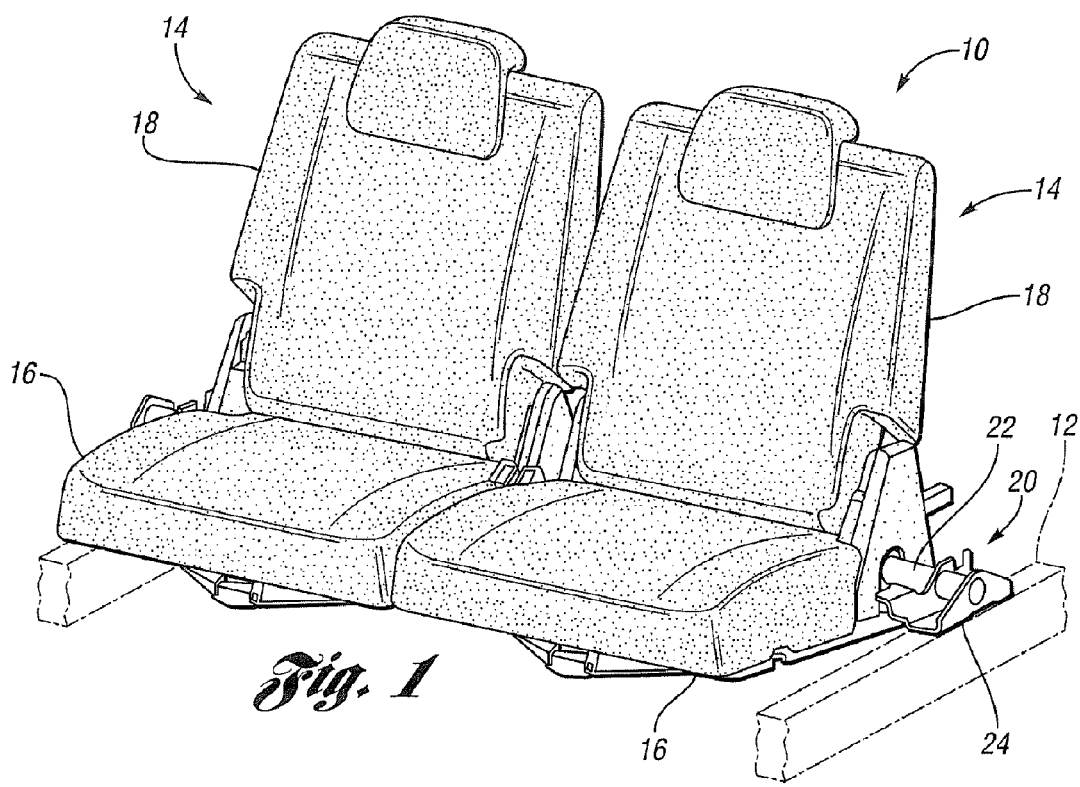
FIG. 1 shows a vehicle seat arrangement, according to the invention, having two seat assemblies that each include a seat bottom and a seat back pivotally connected to the seat bottom.

FIG. 1 shows a seat arrangement 10 according to the invention for use with a vehicle having a vehicle body 12. The seat arrangement 10 may include one or more seat assemblies 14 that each have a seat bottom 16 and a seat back 18 pivotally connected to the seat bottom 16. The seat arrangement 10 further includes a mounting arrangement 20 associated with the seat bottoms 16 for mounting the seat bottoms 16 to the vehicle body 12. For example, the mounting arrangement 20 may include a pivot member 22 about which the seat bottoms 16 may pivot, and one or more brackets 24 for connecting the pivot member 22 to a floor or side wall of the vehicle body 12.

Referring to FIGS. 2–10, a more detailed description of one of the seat assemblies 14 will now be provided, with the understanding that the other seat assembly 14 may have the same or similar configuration. The seat assembly 14 shown in FIGS. 2 and 3 includes first and second latches 26 and 28, respectively, and an automatic stow arrangement 29 for moving the seat bottom 16 and seat back 18 from a use position, shown in FIGS. 2, 3 and 6, to a stowed position, shown in FIG. 8, in which the seat bottom 16 and seat back 18 are disposed at least partially in a recess 30 formed in the vehicle body 12.

It is noted that the terms first latch and second latch are merely used to distinguish the latches from each other. Therefore, depending on the order of presentation of the latches 26 and 28 in the claims, for example, the first latch 26 may be referred to as a second latch, and the second latch 28 may be referred to as a first latch.

The first latch 26 is associated with the seat back 18 and is configured to inhibit movement of the seat back 18 with respect to the seat bottom 16. For example, the first latch 26 may be a seat back latch pivotally connected to outboard seat bottom frame member 31a of the seat bottom 16, and engageable with outboard seat back frame member 32a of seat back 18. The first latch 26 is moveable between a first latch position, shown in FIG. 3, for inhibiting pivotal movement of the seat back 18 toward the seat bottom 16, and a second latch position, shown in FIG. 5, for inhibiting pivotal movement of the seat back 18 away from the seat bottom 16 after the seat back 18 has pivoted toward the seat bottom 16.

Figure 2:
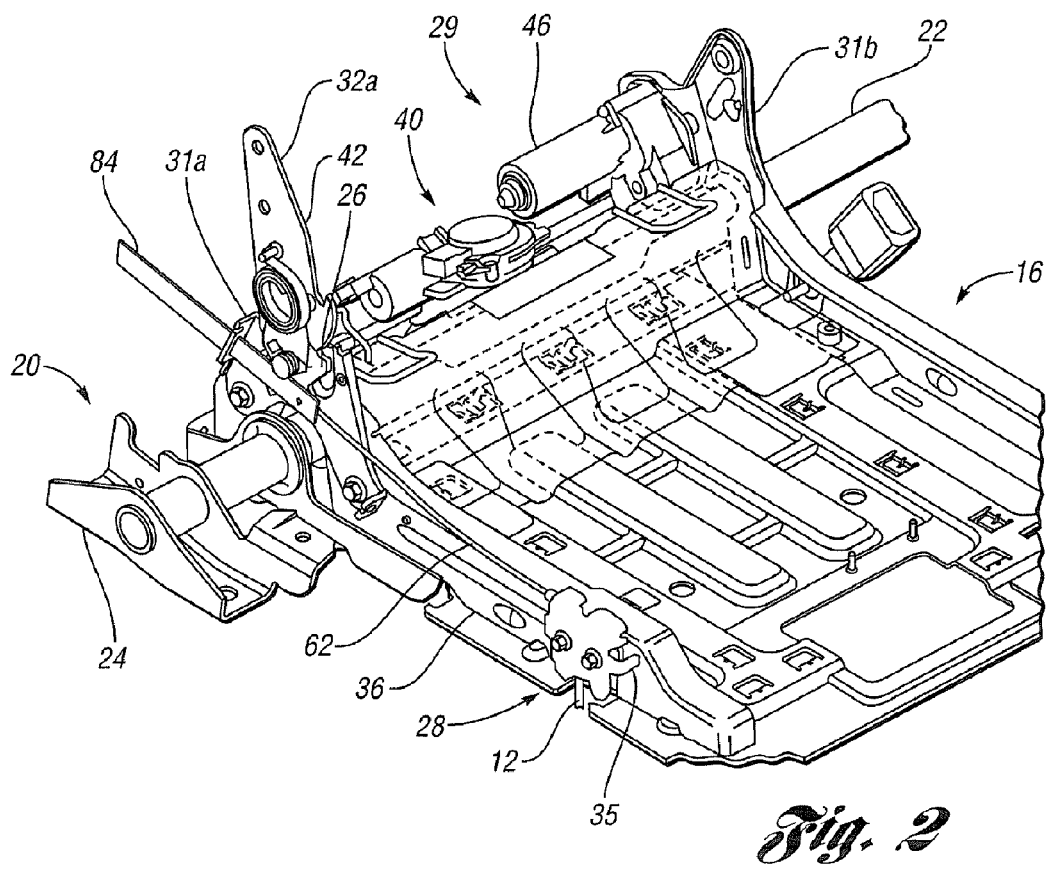
FIG. 2 is a perspective view of one of the seat assemblies showing an automatic stow arrangement for automatically moving the associated seat bottom and seat back from a use position to a stowed position.
Figure 6:
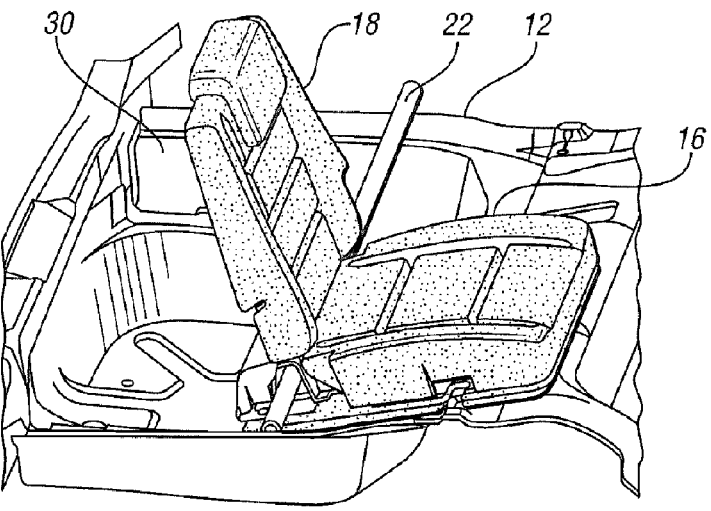
FIG. 6 is a perspective view of one of the seat assemblies, wherein the associated seat bottom and seat back are shown in the use position.

Referring to FIGS. 2 and 3, the second latch 28 is associated with the seat bottom 16 and is engageable with the vehicle body 12 for inhibiting movement of the seat bottom 16 with respect to the vehicle body 12. For example, the second latch 28 may be a floor latch that is engageable with a floor portion of vehicle body 12. While the second latch 28 may have any suitable construction, in one embodiment, the second latch 28 includes a cam member 33 and a latch member 34 that are connected to a front portion of seat bottom main frame 36 of the seat bottom 16, such as with a latch bracket 35. The cam member 33 is engageable with the latch member 34 and is configured to pivot the latch member 34 between a latch position shown in FIG. 3, in which the latch member 34 is engaged with a striker 37 or other engaging member of vehicle body 12, and a release position shown in FIGS. 4 and 5. The second latch 28 may also include one or more springs that urge the latch member 34 toward the latch position. For example, the second latch 28 may include a cam spring 38 engaged with the cam member 33 for urging the cam member 33 in a clockwise direction, with respect to FIG. 3, into engagement with the latch member 34, and a latch spring 39 engaged with the latch member 34 for urging the latch member 34 toward the latch position.

Figure 7:
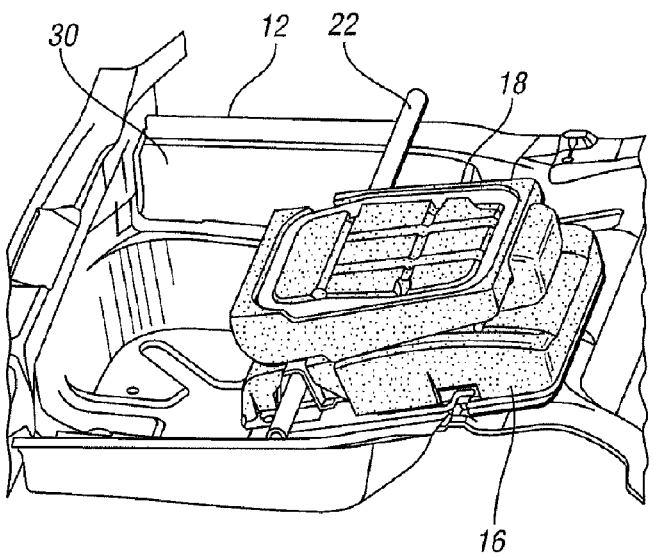
FIG. 7 is a perspective view of the seat assembly of FIG. 6, showing the seat back pivoted against the seat bottom.
Figure 8:
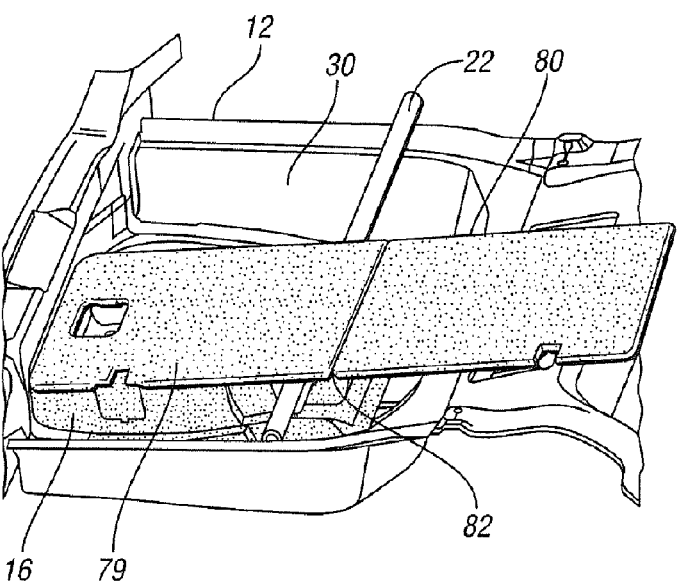
FIG. 8 is a perspective view of the seat assembly of FIG. 6, showing the seat bottom and seat back in the stowed position.

The automatic stow arrangement 29 is associated with the first and second latches 26 and 28, respectively, and is configured to automatically release the latches 26 and 28 to allow the seat back 18 to pivot in a first direction toward the seat bottom 16, as shown in FIG. 7, and to allow the seat bottom 16 and seat back 18 to pivot together in a second direction opposite the first direction to the stowed position, shown in FIG. 8. Referring to FIGS. 2 and 3, the stow arrangement 29 includes a puller mechanism 40 associated with the latches 26 and 28 for releasing the latches 26 and 28, a biasing member, such as first spring 42, associated with the seat back 18 for urging the seat back 18 toward the seat bottom 16, a locking mechanism 44 that assists in releasing the second latch 28 and inhibits movement of the seat back 18 away from the seat bottom 16 after the second latch 28 has been released, and a drive mechanism 46 for pivoting the seat bottom 16 and seat back to the stowed position.

The puller mechanism 40 may have any suitable configuration for moving the first latch 26 from the first latch position, shown in FIG. 3, to an intermediate position, shown in FIG. 4. For example, the puller mechanism 40 may include a cable 48 or other pull member connected to the first latch 26, a reel or spool 50 for retracting or recoiling the cable 48, and a motor 52 associated with the spool 50 for rotating the spool 50 to thereby recoil the cable 48 from an extended position, shown in FIG. 3, to a retracted position. The spool 50 and motor 52 may also be connected to any suitable portion of the seat bottom 16, such as a rear portion of seat bottom main frame 36, as shown in FIG. 2.

The first spring 42 shown in FIGS. 3–5 is a torsion spring having a first end connected to the seat back frame member 32a and a second end connected to bracket 54 fixed to outboard seat bottom frame member 31a. A second spring 56 may also be connected between bracket 54 and first latch 26 for urging the first latch 26 into engagement with the outboard seat back frame member 32a.

The locking mechanism 44 includes a locking member 58 and a lever 60 that are each pivotally connected to the outboard seat bottom frame member 31a. The locking member 58 is connected to the second latch 28, such as with a cable 62 or other connecting member, and is moveable between a first position shown in FIG. 3, and a second position shown in FIG. 4 for releasing the second latch 28. Thus, the locking member 58 may function as a latch-release member. Furthermore, when the first latch 26 is in the second latch position, the locking member 58 is moveable to a locking position shown in FIG. 5, in which the locking member 58 is engageable with the first latch 26 to inhibit movement of the first latch 26, and thereby inhibit pivotal movement of the seat back 18 away from the seat bottom 16. The locking position may be the same as the second position of the locking member 58, for example, or the locking position may be an intermediate position between the first and second positions of the locking member 58.

As shown in FIG. 3, the lever 60 is engageable with the locking member 58 when the locking member 58 is in the first position to inhibit movement of the locking member 58 toward the second position. Referring to FIG. 4, the seat back 18 is engageable with the lever 60 when the seat back 18 pivots toward the seat bottom 16 to thereby disengage the lever 60 from the locking member 58.

Figure 9:
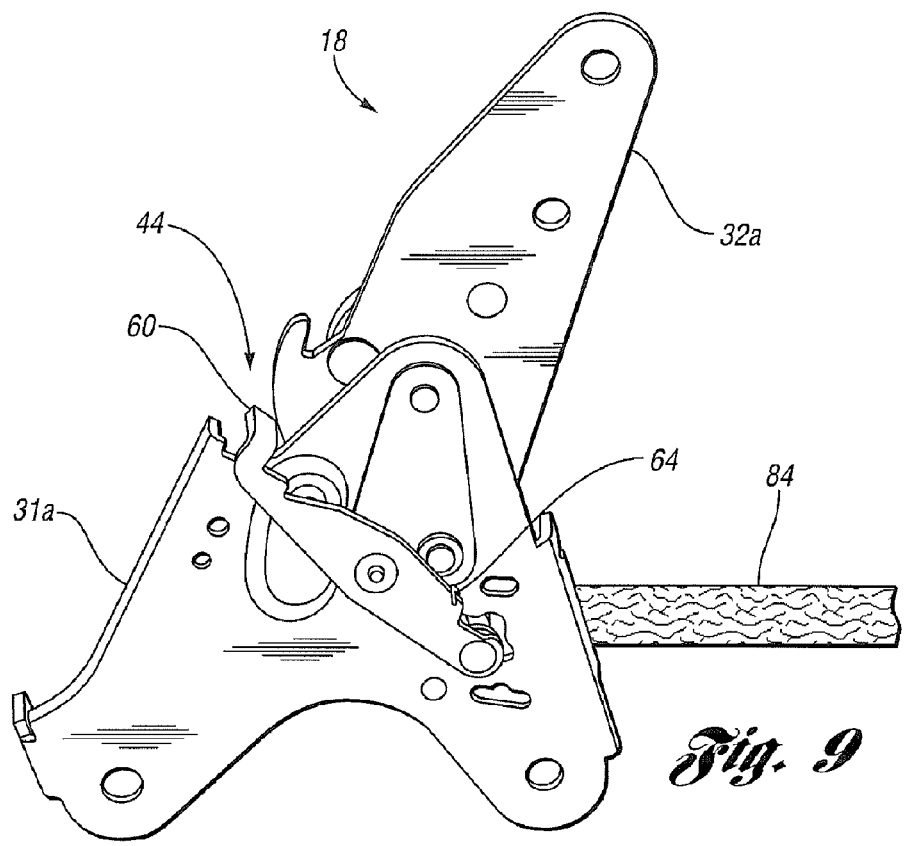
FIG. 9 is a side view of the seat bottom frame member and seat back frame member of the seat assembly of FIG. 2, showing an opposite side of the seat bottom frame member and seat back frame member.

Referring to FIGS. 3 and 9, the locking mechanism 44 may further include third and fourth springs 63 and 64, respectively, engaged with the locking member 58 and lever 60, respectively. The third spring 63 urges the locking member 58 into engagement with the lever 60 (counterclockwise in FIG. 3), and the fourth spring 64 urges the lever 60 into engagement with the locking member 58 (counterclockwise in FIG. 3, and clockwise in FIG. 9).

The drive mechanism 46 is associated with the seat bottom 16 and/or seat back 18 and is engageable with the pivot member 22 to automatically pivot the seat bottom 16 and seat back 18 to the stowed position. For example, referring to FIG. 10, the pivot member 22 may include an elongated pivot body 65 and a first gear 66 fixed to the pivot body 65, and the drive mechanism 46 may include a second gear 67 that is engageable with the first gear 66, and a motor 68 for driving the second gear 67 about the first gear 66. Furthermore, in the embodiment shown in FIG. 10, the drive mechanism 46 is attached to a rear portion of inboard seat bottom frame member 31b.

Referring to FIG. 3, the stow arrangement 29 further includes a control system 70 for controlling operation of the puller mechanism 40 and the drive mechanism 46. The control system 70 may include, for example, a power source 72 connected to the motors 52 and 68, a controller 74 that includes control logic for controlling operation of the motors 52 and 68, and one or more actuators 76 and 77, such as stow and un-stow push buttons, for activating the controller 74. While the actuators 76 and 77 may be disposed in any suitable position in the vehicle, in one embodiment, the actuators 76 and 77 are disposed on the vehicle body 12 proximate the seat bottom 16, such as on a D pillar (not shown) of the vehicle body 12.

Referring to FIGS. 1–10, operation of one seat assembly 14 will now be described, with the understanding that the other seat assembly 14 may operate in the same or similar manner. When it is desired to move the seat assembly 14 from the use position shown in FIGS. 1, 3 and 6 to the stowed position shown in FIG. 8, the stow actuator 76 may be depressed or otherwise actuated to activate the stow arrangement 29. Referring to FIGS. 3–5, the motor 52 of the puller mechanism 40 then operates to retract the cable 48, which releases the first latch 26. Next, the first spring 42 pivots the seat back 18 in the first direction, such as forward, toward the seat bottom 16 as shown in FIG. 4. As a result, the seat back 18 engages the lever 60 and causes the lever 60 to pivot in the same direction as the seat back 18, thereby disengaging the lever 60 from the locking member 58.

The puller mechanism 40 continues to retract the cable 48, which causes the first latch 26 to move to the intermediate position shown in FIG. 4. As the first latch 26 moves toward the intermediate position, the first latch 26 engages the locking member 58 and rotates the locking member 58 in the second direction, such as rearward. As a result, the locking member 58 pulls the cable 62, which releases the second latch 28, as shown in FIG. 4.

The controller 74 then controls operation of the puller mechanism 40 to move the cable 48 toward the extended position, which allows the second spring 56 to move the first latch 26 to the second latch position, as shown in FIG. 5. In the second latch position, the first latch 26 is engaged with a projection 78 of the outboard seat back frame member 32a for inhibiting movement of the seat back 18 away from the seat bottom 16.

As the first latch 26 moves toward the second latch position, the third spring 63 urges the locking member 58 toward the locking position shown in FIG. 5. In the locking position, the locking member 58 is engageable with the first latch 26 to inhibit movement of the first latch 26 away from the second latch position. As a result, the locking member 58 may function to inhibit pivotal movement of the seat back 18 away from the seat bottom 16 when the seat back 18 has been pivoted in the first direction and the second latch 28 has been released. Thus, the seat back 18 may be prevented from returning to the use position when the second latch 28 has been released.

Figure 10:
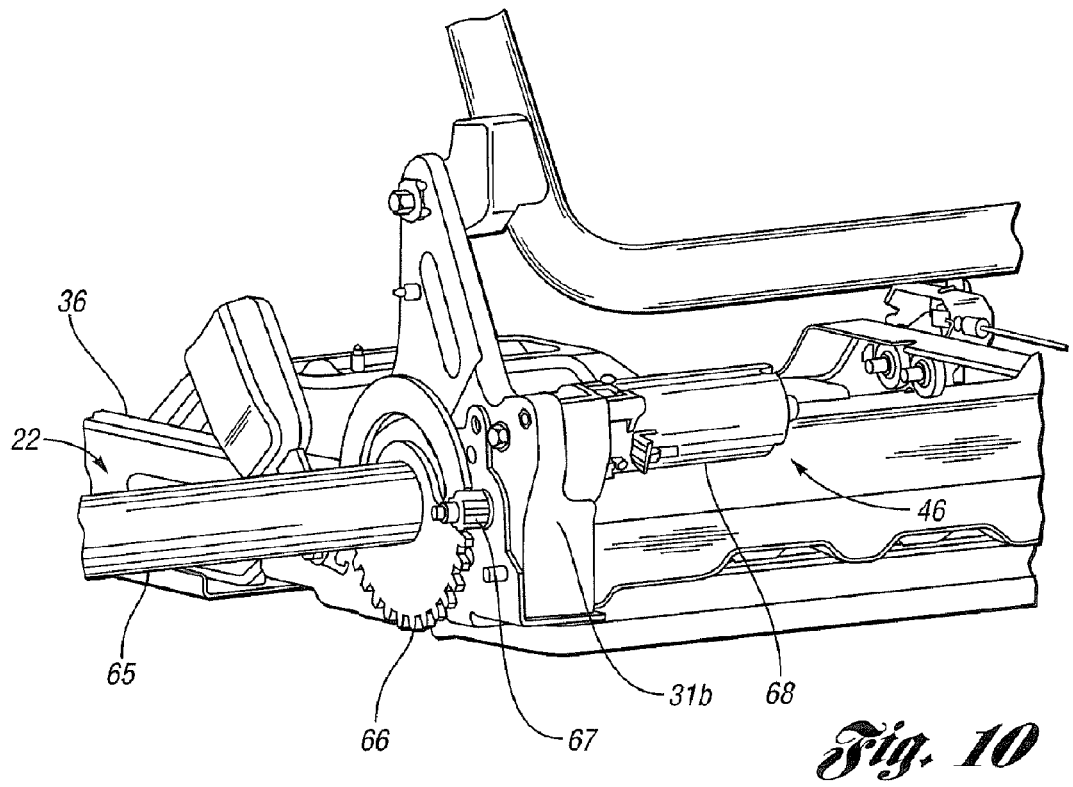
FIG. 10 is an enlarged rear perspective view of a portion of the seat assembly of FIG. 2, showing a drive mechanism of the stow arrangement.

Next, referring to FIG. 10, the control system 70 activates the motor 68 of the drive mechanism 46, which drives the second gear 67 about the first gear 66. As a result, the seat bottom 16 and seat back 18 pivot rearwardly from the position shown in FIG. 7 to the stowed position shown in FIG. 8.

The seat assembly 14 may also include first and second load floor portions 79 and 80, respectively, that cooperate to define a substantially flat load floor when the seat bottom 16 and seat back 18 are in the stowed position. In the embodiment shown in FIG. 8, for example, the first load floor portion 79 is connected to the seat bottom 16, and the second load floor portion 80 is connected to the vehicle body 12 and to the first load floor portion 79 with hinge 82.

When it is desired to return the seat bottom 16 and seat back 18 to the use position, the un-stow actuator 77 may be actuated to cause the control system 70 to activate the stow arrangement 29. More specifically, the control system 70 may activate the motor 68 of the drive mechanism 46, to thereby pivot the seat bottom 16 and seat back 18 in the first direction away from the stow position shown in FIG. 8 and to the position shown in FIG. 7. As the seat bottom 16 and seat back 18 pivot in the first direction, the second latch 28 re-latches on the striker 37, which causes the locking member 58 to move to the first position shown in FIG. 3. A manual release member 84, such as a pull strap, connected to the first latch 26 may then be pulled to release the first latch 26 from the second latch position. Next, the seat back 18 may be manually returned to the use position shown in FIGS. 3 and 6.

The stow arrangement 29 of the invention therefore provides automatic movement of the seat bottom 16 and seat back 18 from the use position to the stowed position. Furthermore, the stow arrangement 29 is configured to automatically return the seat bottom 16 and seat back 18 to the intermediate position shown in FIG. 7, such that the seat back 18 may be manually returned to the use position shown in FIG. 6.

Although the latches 26 and 28 are shown on the outboard side of the seat assembly 14, and the drive mechanism 46 is shown on the inboard side of the seat assembly 14, these components may be disposed at any suitable location on the seat assembly 14. For example, the latches 26 and 28 may be located on the inboard side of the seat assembly 14, and the drive mechanism 46 may be located on the outboard side of the seat assembly 14. As another example, all of the above components may be located on the same side of the seat assembly 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for use with a vehicle having a vehicle body, the assembly comprising:
   a seat bottom that is configured to be pivotably mounted to the vehicle body;
   a seat back pivotally connected to the seat bottom;
   a seat back latch associated with the seat back for inhibiting movement of the seat back with respect to the seat bottom; and
   an automatic stow arrangement for moving the seat bottom and seat back from a use position to a stowed position, the stow arrangement being associated with the seat back latch and configured to release the seat back latch to allow the seat back to pivot in a first direction toward the seat bottom, the stow arrangement further being configured to pivot the seat bottom and seat back in a second direction opposite the first direction to the stowed position.

2. The assembly of claim 1 further comprising an additional latch associated with the seat bottom and being configured to engage the vehicle body to inhibit movement of the seat bottom with respect to the vehicle body, wherein the stow arrangement is configured to automatically release the additional latch to allow the seat bottom to pivot.

3. The assembly of claim 2 wherein the stow arrangement includes a locking mechanism that is configured to inhibit pivotal movement of the seat back away from the seat bottom after the additional latch has been released.

4. The assembly of claim 3 wherein the seat back latch is moveable between a first latch position for inhibiting pivotal movement of the seat back toward the seat bottom and a second latch position for inhibiting pivotal movement of the seat back away from the seat bottom after the seat back has pivoted toward the seat bottom, the locking mechanism includes a locking member connected to the additional latch and being moveable between a first position and a second position for releasing the additional latch, and wherein the locking member is engageable with the seat back latch when the seat back latch is in the second latch position to inhibit movement of the seat back latch, thereby inhibiting pivotal movement of the seat back away from the seat bottom.

5. The assembly of claim 4 wherein the locking mechanism further includes a moveable lever that is engageable with the locking member when the locking member is in the first position to inhibit movement of the locking member toward the second position, and wherein the seat back is engageable with the lever when the seat back pivots toward the seat bottom to thereby disengage the lever from the locking member.

6. The assembly of claim 4 wherein the stow arrangement includes a puller mechanism connected to the seat back latch for moving the seat back latch away from the first latch position, such that the seat back latch engages the locking member and moves the locking member from the first position to the second position.

7. The assembly of claim 1 further comprising a mounting arrangement associated with the seat bottom for mounting the seat bottom to the vehicle body, the mounting arrangement including a pivot member about which the seat bottom may pivot.

8. The assembly of claim 7 wherein the stow arrangement includes a drive mechanism connected to the seat bottom and being engageable with the pivot member to automatically pivot the seat bottom.

9. The assembly of claim 8 wherein the pivot member includes an elongated pivot body and a first gear fixed to the pivot body, and wherein the drive mechanism includes a second gear that is engageable with the first gear.

10. The assembly of claim 1 wherein the stow arrangement includes a motorized puller mechanism connected to the seat back latch for releasing the seat back latch.

11. A seat assembly for use with a vehicle having a vehicle body, the seat assembly comprising:

a seat bottom;

a mounting arrangement associated with the seat bottom for mounting the seat bottom to the vehicle body, the mounting arrangement including a pivot member about which the seat bottom may pivot;

a first latch associated with the seat bottom and being engageable with the vehicle body for inhibiting movement of the seat bottom with respect to the vehicle body;

a seat back pivotally connected to the seat bottom;

a second latch associated with the seat back for inhibiting movement of the seat back with respect to the seat bottom; and an automatic stow arrangement for moving the seat bottom and seat back from a use position to a stowed position, the stow arrangement being associated with the first and second latches and configured to release the latches to allow the seat back to pivot in a first direction toward the seat bottom, and to allow the seat bottom and seat back to pivot together in a second direction opposite the first direction to the stowed position, the stow arrangement including a biasing member associated with the seat back for urging the seat back to pivot in the first direction toward the seat bottom, a locking mechanism that is configured to inhibit movement of the seat back away from the seat bottom after the first latch has been released, and a drive mechanism connected to the seat bottom and being engageable with the pivot member to automatically pivot the seat bottom and seat back to the stowed position.

* * * * *